(No Model.)

J. NORTON, Jr.
DRYING FLOUR.

No. 357,092. Patented Feb. 1, 1887.

Witnesses:
H. Monder
Alf. Paquin

Inventor.
Joshua Norton Jr

United States Patent Office.

JOSHUA NORTON, JR., OF DUBUQUE, IOWA.

DRYING FLOUR.

SPECIFICATION forming part of Letters Patent No. 357,092, dated February 1, 1887.

Application filed March 7, 1884. Serial No. 123,331. (No model.)

*To all whom it may concern:*

Be it known that I, JOSHUA NORTON, Jr., of the city of Dubuque, in the county of Dubuque, in the State of Iowa, have invented a new and useful Improvement in Drying Flour; and I do hereby declare that the following is a full and exact description of the same, reference being had to the accompanying drawings, and to the letters of reference marked thereon.

It has been found that flour, especially that manufactured by the "roller process," possesses more or less moisture, and that if such moisture be not evaporated therefrom the flour will become rancid and sour. I am aware that this moisture has been evaporated by various processes; but in all or nearly all of these the flour is placed upon heated metallic surfaces in one way or another, and by these processes the quality of the flour is materially injured before it is thoroughly dried.

To avoid all injury to the flour and to evaporate from it the moisture, I pass the flour upon an endless apron, preferably made of cotton canvas, in or through a heated room. During its passage through this room the flour is thoroughly stirred to admit the heat through it and to allow the released moisture to pass from it.

In order that my invention may be better understood I will proceed to describe the same in connection with the accompanying drawings, in which—

Figure 2:
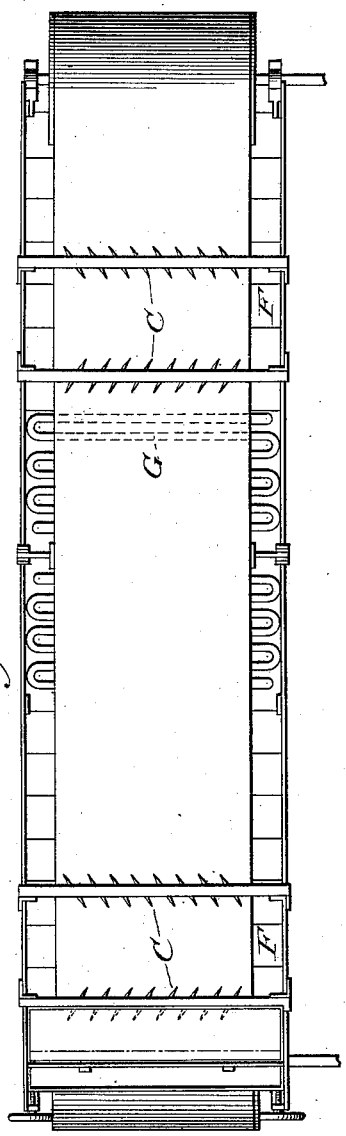
Figure 1:
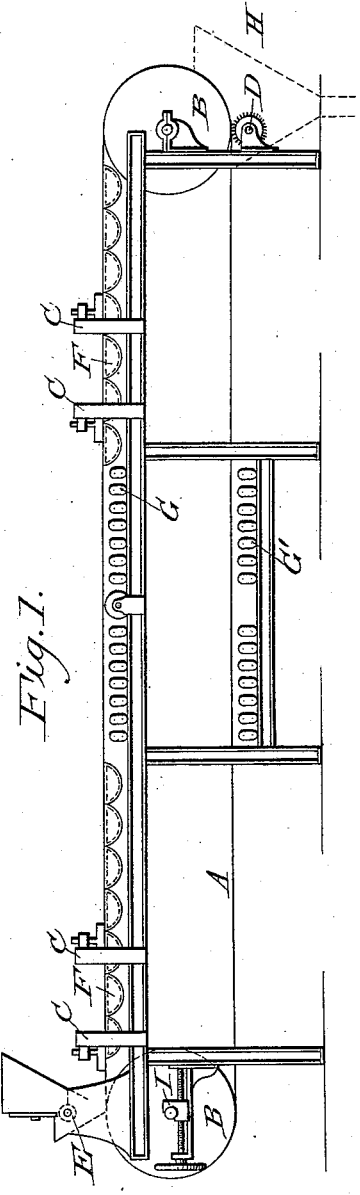

Figure 1 is a vertical sectional view of my device, and Fig. 2 is a top view of the same.

Like letters represent like parts in all of the figures.

A denotes an endless apron passing around the drums B B, supported by suitable framework.

E represents a feed-box through which the material to be dried is fed upon the apron A. Over this apron A, I place near each end at intervals the rakes or stirrers C C, which I place usually over the flat-surfaced tubes F F, and so arranged that the flour in passing through them is moved to one side in the form of furrows, exposing different parts of the flour to the heat and exposing the apron, thus permitting the moisture to pass from the flour and from the apron and drying the exposed parts of both. The next rake moves the flour back into the dried and freshly-heated space on the apron, each movement of the flour aiding the evaporating process as at first, by this means drying the flour more evenly and rapidly, and increasing the capacity of the apron. Underneath the apron A at each end for about one-third of the distance betweeen the drums B B, I place a series of semi-cylindrical tubes, F F, upon the flat surfaces of which the apron A traverses. Into these tubes is admitted steam, for the purpose of heating the apron and flour while passing over them. Another advantage and purpose of these semi-cylindrical tubes having their upper surfaces flat is to hold the loaded apron up level, so that the rakes or stirrers C C will reach through the flour and thoroughly stir the same to the bottom, where it rests upon the apron. Along under the center of this apron A, for about one-third of the distance between the drums B B, I place a series of steam-pipes, G G, leaving a small space between the pipes and the apron, in order to allow the heat from them to radiate through the apron, and at the same time to allow the moisture that may have been absorbed in the apron to pass off. The lower series of steam-pipes, G', serves to also thoroughly dry this apron as it returns after delivering the dried flour and before any more is taken upon it.

Just under the drum B, where the apron begins to return, I place a revolving brush, D, for the purpose of removing all particles of flour that may have adhered to the apron A.

The drums B B may be made of wood or metal. If the latter, then steam may be admitted into them, making additional heating-surface thereby.

H is the receptacle for receiving the flour after it is dried.

I is a movable box for the purpose of tightening the apron A.

I do not desire to be limited to just this method of heating the flour upon this apron, for it is manifest that there may be numerous devices for accomplishing this result without departing from the spirit of my invention.

The manner of operating my device is as follows: I place the flour to be dried in the feed-box E, which has in it any effectual way of distributing the flour evenly upon the apron A. The apron then passes, with the flour upon it, over the surfaces of the flat-surfaced tubes F F, and underneath the rakes or stirrers C C, where it becomes heated and at the same time loosened up and stirred by the rakes or stirrers C C. It then passes over the pipes G G, at a slight distance above them, where it is still further heated and the moisture that has been absorbed in the apron is allowed to pass off on the under side between the apron and the pipes. I find better results by not stirring the flour in its passage over these pipes. It then traverses the second series of flat-surfaced tubes F F, where it is still further heated and stirred, as at the beginning, and is then delivered into the receptacle H. The apron then on its return empty passes over the lower series of pipes, G', where it is thoroughly dried and heated ready to repeat the same operation.

Having thus described my invention, what I claim as new, and desire to secure by Letters Patent therefor, is—

In a device for the purpose shown and character described, an endless apron, with means for operating the same, and stirrers for loosening up the material to be dried, in combination with the steam tubes and pipes F and G, whereby the heat is furnished to the under side of said apron to evaporate such moisture from the flour, substantially as and for the purposes shown.

In testimony whereof I affix my signature in presence of two witnesses.

JOSHUA NORTON, JR.

Witnesses:
MONROE M. CADY,
KATIE M. CADY.